United States Patent
Klaghofer et al.

(10) Patent No.: US 7,426,208 B2
(45) Date of Patent: Sep. 16, 2008

(54) PRE-PROCESSING OF NAT ADDRESSES

(75) Inventors: Karl Klaghofer, München (DE);
Harald Müller, Gilching (DE); Jürgen Totzke, Poing (DE); Gerald Volkmann, München (DE)

(73) Assignee: Siemens Aktiengesellschaft, Munich (DE)

( * ) Notice: Subject to any disclaimer, the term of this patent is extended or adjusted under 35 U.S.C. 154(b) by 796 days.

(21) Appl. No.: 10/488,323

(22) PCT Filed: Aug. 1, 2002

(86) PCT No.: PCT/DE02/02840
§ 371 (c)(1),
(2), (4) Date: Feb. 27, 2004

(87) PCT Pub. No.: WO03/028340
PCT Pub. Date: Apr. 3, 2003

(65) Prior Publication Data
US 2004/0264449 A1   Dec. 30, 2004

(30) Foreign Application Priority Data
Aug. 30, 2001   (DE) .................... 101 42 500

(51) Int. Cl.
*H04L 12/56* (2006.01)
(52) U.S. Cl. ............................. 370/392; 370/401
(58) Field of Classification Search ............. 370/389, 370/392
See application file for complete search history.

(56) References Cited

U.S. PATENT DOCUMENTS 5,793,763 A    8/1998 Mayes et al.
6,661,799 B1 *  12/2003 Molitor .................. 370/401
6,772,210 B1 *  8/2004 Edholm ................... 709/226
7,047,561 B1 *  5/2006 Lee ........................ 726/12

(Continued)

FOREIGN PATENT DOCUMENTS

WO    WO 99/55056    10/1999

(Continued)

OTHER PUBLICATIONS

Jose C. Brustoloni and Juan A. Garay; "Application-Independent End-to-End Security In Shared-Link Access Networks"; Proceedings of the Networking 2000 Conference, IFIP, Paris, France; Lecture Notes in Computer Science, vol. 1815, pp. 608-619, May 2000.

(Continued)

*Primary Examiner*—Chau Nguyen
*Assistant Examiner*—Marcus R Smith

(57) ABSTRACT

A method for packet-oriented transmission of speech, audio, video and/or useful data between an internal and a public data network by means of a pre-reservation of NAT addresses. A pre-NAT address is allocated to the IP address of an internal computer by an NAT address server. The relevant allocation data set is available in a NAT host 200 which acts as a gateway between the internal and the public data network; whereby single addresses (pre-NAT addresses) are provided for transparent use of the data packet in the internal and public network when the information on the origin or destination in an IP Header or in the protocol data, in addition to the information on origin or destination in said header, is modi.

3 Claims, 2 Drawing Sheets

U.S. PATENT DOCUMENTS

2002/0152325 A1* 10/2002 Elgebaly et al. ............. 709/246

FOREIGN PATENT DOCUMENTS

WO      WO 02/23822 A1     3/2002

OTHER PUBLICATIONS

Fredrik Thernelius; "SIP, NAT, AND Firewalls", Master Thesis, May 2000, XP-002209773; pp. 1-69.

Eun-Sang Lee, Hyun-Seok Chae, Byoung-Soo Park and Myung-Ryul Choi; "An Expanded NAT with Server Connection Ability"; IEEE Tencon, 1999; 07803-5739-6/99; pp. 1391-1394.

Andrew Molitor; Requirements text; Dec. 2000, found online on Apr. 16, 2002 at <http://www.fokus.gmd.de/research/cc/glone/ietf/foglamps/msg00430.html>, 7 pages.

* cited by examiner

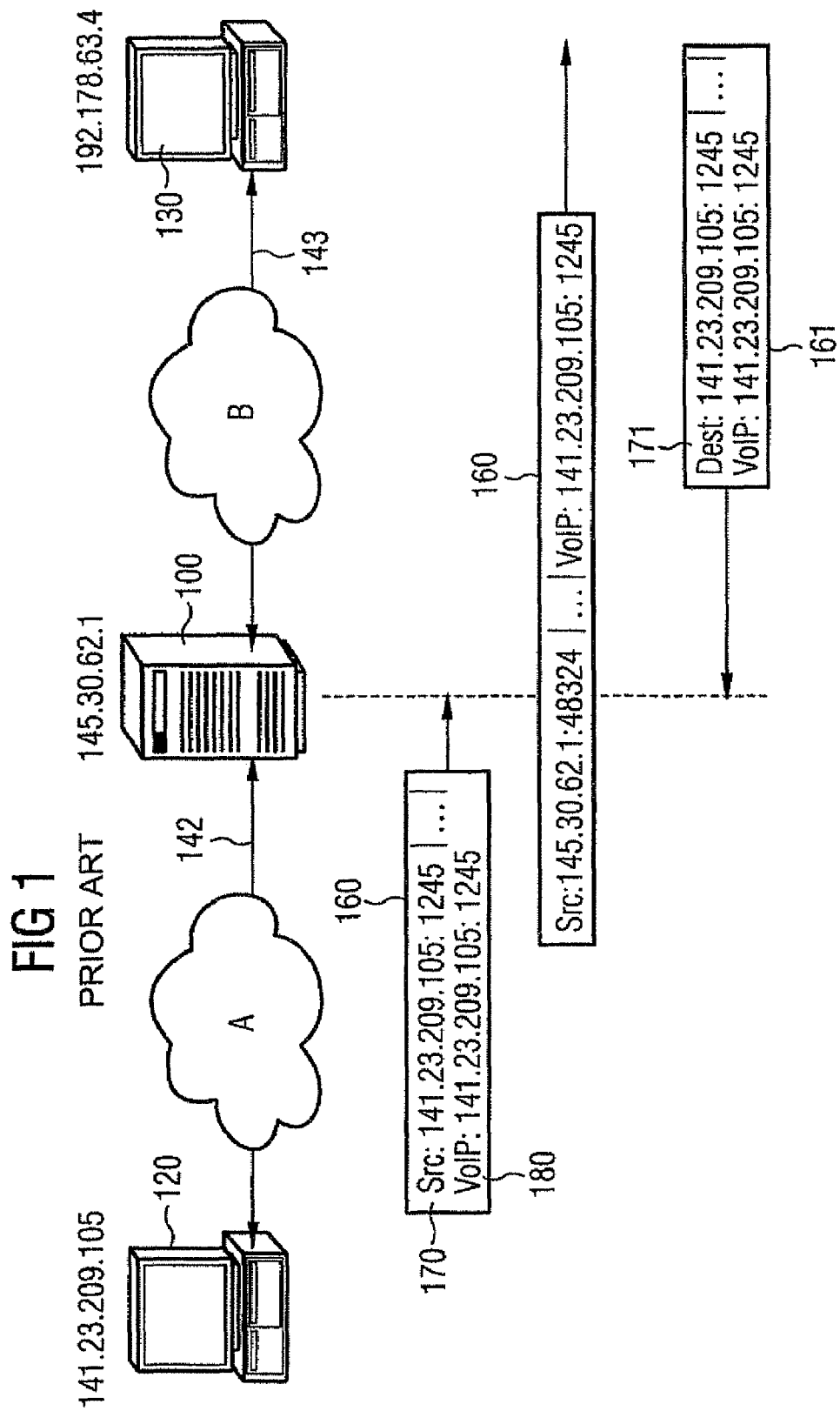

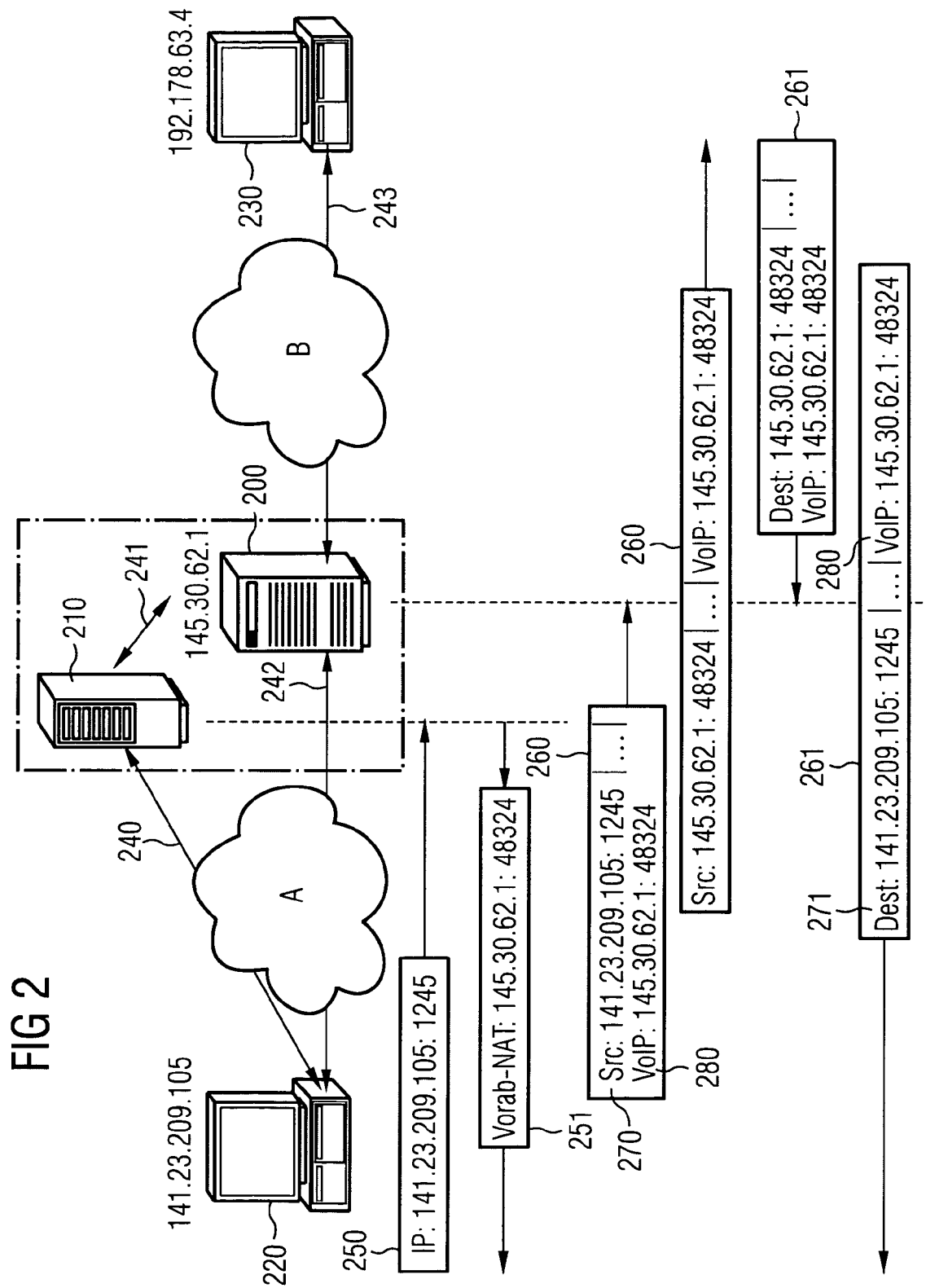

PRE-PROCESSING OF NAT ADDRESSES

CROSS REFERENCE TO RELATED APPLICATIONS

This application is the US National Stage of International Application No. PCT/DE02/02840, filed Aug. 1, 2002 and claims the benefit thereof. The International Application claim the benefits of German application No. 10142500.7 filed Aug. 30, 2001, both of the applications are incorporated by reference herein in their entirety.

FIELD OF INVENTION

The invention relates to a method for packet-oriented transmission of data between an internal network and a public data network, and to an arrangement for carrying out such a method.

BACKGROUND OF INVENTION

Methods of the type in question are nowadays widely used for the transmission of speech, audio, video and/or useful data across network boundaries, e.g. between internal and public data networks. During the transmission of data over IP networks, problems repeatedly arise when an address translation is performed at a network boundary using NAT (Network Address Translation). For various reasons, NAT is of crucial importance for Internet technology here. In addition to providing load distribution in parallel processing, various types of access security provisions in the sense of a firewall as well as fault tolerance and high availability are supported. Basic network administration functions are also simplified.

Since the address space provided at the time the Internet was founded will no longer suffice for the assignment of IP (IP: Internet Protocol) addresses in the foreseeable future, and especially since the expansion of internal and highly complex data networks requires more and more IP addresses, NAT is however used above all to hide internally used IP addresses from the outside. Firstly this makes it easier to manage internal networks, and secondly it saves on costs, since fewer chargeable public IP addresses need be used externally than are actually required internally. In principle it is theoretically possible here to map an internal network of up to 60,000 computers to a single public IP address by varying the port address of the public IP address.

With NAT, when an IP data packet is sent, first of all the IP header of this packet is exchanged. The internal IP address including port number is replaced by a public IP address with a different port number. An NAT host stores the mapping of internal IP address to the public (external) IP address. If the NAT host then receives an IP data packet, it maps the public (external) IP address back onto the internal IP address. The NAT host should be understood here as a computer linking two networks together on which appropriate software (NAT engine) handles the address translation.

It is however a problem that some IP protocols also send the internal IP addresses again as protocol data (e.g. with Voice-over-IP protocols). At the NAT host only the IP headers of a data packet are exchanged, the protocol data itself is not accessed, since it cannot be resolved by the NAT host. The addressed external computer in the public network now sends its reply, not to the public address in the IP header of the data packet, but to the internal IP address which the service used (e.g. Voice-over-IP) has read out from the protocol data. However, the original sender cannot be reached under this address. The reply is therefore sent either to an unknown IP address or to a different public computer which is unable to do anything with this IP data packet.

The problem described here has hitherto not been solved. There have been isolated attempts to use directly on the NAT host a protocol analyzer which is able to unpack certain protocols and also, in addition to the IP header, to change here the protocol data in accordance with the NAT mapping. However, this regular access to protocol data together with its analysis would slow down the data traffic considerably. Moreover, depending on the protocol type used, it might prove necessary to use not just one, but several protocol analyzers. The problem could be solved in future by IPv6 (Internet Protocol Version 6—with extended IP address space), but IPv6 will not be implemented across the board for a long time to come. Owing to the greatly increased interest of companies in Internet telephony and in exchanging image and useful data, however, a speedy and reliable solution of the problem outlined is required.

SUMMARY OF INVENTION

The object of the present invention is to provide a method which, while retaining existing NAT configurations, enables the establishment of transparent connections for more complex protocols (speech, audio, video and/or useful data) via an NAT host.

It is a further object of the present invention to provide an arrangement for carrying out the method according to the invention.

One central idea of the method according to the invention is to support on the one side more complex protocols (e.g. Voice-over-IP) to an unchanged extent in such a way that the problems with the addressing of computers in the public IP network which arise solely as a result of using NAT are solved. This is enabled in the packet-oriented transmission of speech, audio, video and/or useful data between an internal and a public data network by a pre-reservation of NAT addresses, whereby first of all a request of an internal computer is sent to an NAT address server to provide a pre-NAT address for an IP address of the internal computer. Said pre-NAT address for the IP address of the internal computer is allocated by the NAT address server. The current allocation data set between the pre-NAT address and the IP address of the internal computer is finally sent by the NAT address server to an NAT host. The current allocation data set for modifying the origin or destination specifications in the header of a data packet (IP header) is therefore present at the NAT host acting as the gateway between the internal and the public data network. In the next step, the pre-NAT address of the internal computer is sent from the NAT address server to the internal computer. At the computer, said pre-NAT address is introduced as the sender address into the protocol data of a data packet by the respective service (e.g. Voice-over-IP). A data packet, in particular with Voice-over-IP protocol data which now contains the pre-NAT address as the Voice-over-IP address, is then sent by the internal computer to the NAT host. On said host, in the next step an origin specification in the header of the data packet (IP header), which specification contains the IP address of the internal computer, can be exchanged for the allocated pre-NAT address. As a result, standardized addresses (pre-NAT addresses) are present in both the protocol data of the data packet and in the origin specification in the header of said packet for transparent use of the data packet in both the internal and the public data network. Finally, the data packet is forwarded by the NAT host to an externally addressed computer.

The advantage of this solution is that the NAT host no longer has to concern itself with the protocol data. The internal computer(s) (clients) can contact the NAT server in order to discover their future NAT address already in advance. This is taken into account when assembling the protocol data. The external computer in the public data network now receives in the protocol data the correct reply address, which then goes to the NAT host and the latter then can deliver the reply correctly to the internal computer. The workload on the NAT host is also reduced since it now no longer itself has to unpack the data packet in accordance with the protocol used, but rather only exchanges the origin specification in the header of the data packet (IP header) as before.

Advantageous developments of the method according to the invention are disclosed in subclaims 2 and 3.

The data packet with the pre-NAT address from the externally addressed computer is preferably received by the NAT host. In the next step, using the current allocation data set, said host can exchange [lacuna], by exchanging a destination specification in the header of the data packet (IP header), which specification corresponds to the pre-NAT address, for the allocated IP address of the internal computer. In the next step, the data packet is then forwarded by the NAT host to the internally addressed computer. A particular advantage is conferred by the fact that the usual exchange of destination specification in the header of the data packet (IP header) by the externally addressed computer can be retained unchanged in the conventional framework. By virtue of the fact that transparent addresses are however now present in the destination specification in the header of the data packet (IP header) and in the protocol data transported with said data packet, misrouting of the data packet is precluded.

The NAT host preferably requests the current allocation data set from the NAT address server before the actual exchange of the destination specification in the header of the data packet (IP header) of the external computer is performed. A duplicated assignment of pre-NAT addresses to data packets that are not the result of a request from the internal network into the public network is consequently avoided. The exchange of the destination specification in the header of a data packet (IP header) sent from the public network into the internal network can then be performed taking into account the current data set of already assigned IP addresses.

The object of the present invention is furthermore achieved by an arrangement for carrying out the method according to the invention.

In this arrangement, in addition to an NAT host which connects at least one internal data network to a public data network, and at least one internal computer which communicates or can communicate with a public computer via the NAT host, an NAT address server is provided which is connected, or can establish a connection, to the internal computer and to the NAT host, and which serves to determine and allocate pre-NAT addresses to the IP address of an internal computer.

The determination of pre-NAT addresses includes here the management (adding, updating, deleting) of already assigned mappings in order to avoid duplicated assignment of pre-NAT addresses to IP addresses of internal computers. An address (pre-NAT address, IP address) is always understood here to refer to the IP number (e.g. 141.23.209.105) together with a port number (e.g. 1245). Since the IP number of the NAT host is always the same, the mapping of the pre-NAT address is resolved via the assignment of a port number to the IP number of the NAT host, which finally references the IP address (IP number and port number) of the internal computer.

Advantageous developments of the arrangement according to the invention are disclosed in claims 5 and 6.

In this arrangement the NAT address server preferably runs together with the NAT host on the same computer. The NAT host can handle here the functionalities of a gatekeeper, such as address translation, access control, bandwidth control, etc. of multimedia services. As a result of the close linking of the NAT host and its special services to the NAT address server on the same computer, in particular communication protocols over the data network are avoided. The NAT address server can therefore quickly ascertain used or free IP_ addresses from the NAT host before mapping to IP addresses of the internal computer is performed.

It is also especially advantageous if standardized protocols, in particular SIP (Session Initiation Protocol) or H.323, are used to transmit speech, audio and/or video data packets over network connections. In conjunction with the arrangement according to the invention, said protocols offer mechanisms for call forwarding, call signaling, inclusion of supporting data, media control and supplementary services. H.323 is a proven protocol here which is used in particular thanks to its user friendliness, reliability and interoperability with PSTN (Public Switched Telephone Network). SIP is a new protocol which guarantees scalability, flexibility and easy implementation when setting up complex systems.

BRIEF DESCRIPTION OF THE DRAWINGS

The invention is explained in greater detail below with reference to an exemplary embodiment, where:

FIG. 1 shows packet-oriented transmission of speech, audio, video and/or useful data between an internal A and a public data network B according to the prior art, and FIG. 2 shows an arrangement according to the invention for the packet-oriented transmission of speech, audio, video and/or useful data between an internal A and a public data network B.

DETAILED DESCRIPTION OF INVENTION

To elucidate the problem solved by the invention, FIG. 1 illustrates the problem once again in an arrangement according to the prior art. In this arrangement, an NAT host 100 having the IP number 145.30.62.1 connects an internal A to a public data network B. A computer 120 having the IP number 141.23.209.105 is connected via the NAT host 100 to a further computer 130 having the IP number 192.178.63.4. When communication is established between the computers 120, 130, first of all a data packet 160 is sent from the internal computer 120 to the NAT host 100 over a network connection 142. The IP address (comprising IP number and port number) of the computer 120, namely 141.23.209.105:1245, is used as the origin specification 170 of the data packet. The protocol data includes the Voice-over-IP address 180, which is identical to the IP address of the computer 120, used by the specific service running on the computer 120.

On the NAT host 100, the origin specification of the data packet 160, that is to say the IP address 141.23.209.105:1245 of the computer 120, is now replaced by the publicly visible IP number 145.30.62.1 of the NAT host 100 together with an allocated port number, namely 48324. This port number 48324 can be used for mapping the modified origin specification onto the original origin specification, that is to say the IP address 141.23.209.105:1245 of the computer 120. During this modification of the origin specification of the data packet 160, the Voice-over-IP address 180 however continues to remain 141.23.209.105:1245 and consequently the same as the original IP address of the computer 120.

Said data packet 160 is forwarded to the computer 130 over the network connection 143. In turn said computer 130 receives the message and uses for connection establishment the Voice-over-IP address present for the respective service, here Voice-over-IP, in the protocol data of the data packet 160. As a result, however, the sent back data packet 161 of the computer 130 is addressed to the original IP address of the computer 120. With the destination specification 171 of the data packet 161, that is to say the IP address 141.23.209.105: 1245, the reply therefore goes either to an unknown IP address or to a different public computer which is unable to do anything with this data packet. The illustrated problem is therefore that an address translation takes place at the NAT host 100 which, although it modifies the origin specification 170 or destination specification 171 (the IP header) of the data packet 160 or 161 respectively, it leaves untouched the relevant Voice-over-IP address 180 for the Voice-over-IP service used. However it is specifically this service that addresses in the destination specification 171 of the returning data packet 161 the IP address that was stored for the service in the protocol data specified for it.

FIG. 2 now shows an arrangement according to the invention in which an NAT host 200 again connects an internal A to a public data network B. The NAT host 200 having the IP number 145.30.62.1 communicates bidirectionally with an NAT address server 210, with NAT-Host 200 and NAT address server 210 being connected to an internal computer 220 having the IP number 141.23.209.105 over network connections 240 and 242 respectively. The NAT host and NAT address server can also run on the same computer, but in order to illustrate the basic functioning of the arrangement according to the invention, they are shown separately here. The computer 220 is connected via the NAT host 200 to a further computer 230 having the IP number 192.178.63.4.

In order to preclude the problem described above, the computer 220 first sends a request over the network connection 240 to the NAT address server 210 for it to allocate a pre-NAT address 251 for its IP address 250, in this case 141.23.209.105:1245. The NAT address server 210 first determines an as yet unallocated pre-NAT address 251, which it then dispatches to the computer 220 over the network connection 240. The pre-NAT address in the present exemplary embodiment is 145.30.62.1:48324. The port number 48324 of the pre-NAT address can thus be used for mapping onto the IP address 141.23.209.105:1245 of the computer 220. The IP number 145.30.62.1 of the pre-NAT address 251 corresponds to the IP number of the NAT host 200 which is externally visible to the public network B.

In the next step, the computer 220 then sends a data packet 260 to the NAT host 200 in whose protocol data the assigned pre-NAT address 145.30.62.1:48324 is found as Voice-over-IP address 280. The origin specification 270 in the header of the data packet (IP header) 260 is by contrast the IP address of the computer 220, namely 141.23.209.105:1245. An address translation of the origin specification 270 of the data packet is in turn performed on the NAT host 200, during which translation the IP address of the computer 220 is [lacuna] for the pre-NAT address 145.30.62.1:48324 allocated by the NAT address server 210. Following the assignment of the pre-NAT address by the NAT address server 210, this current allocation of the pre-NAT address to the IP address of the computer 220 (mapping) is notified to the NAT host 200 over the network connection 241 or is requested by the NAT host 200. The IP address of the internal computer 220 can now be traced back via the mapping of the port number 48324 to the IP address of the internal computer 220, namely 141.23.209.105:1245.

In a further step, the data packet 260 is sent by the NAT host 200 to the external computer 230 over the network connection 243. For sending back the data packet 261, the Voice-over-IP service used there uses the Voice-over-IP address 280, which now corresponds to the pre-NAT address 251, present in the protocol data as the destination specification 271. Said destination specification 271 is now 145.30.62.1:48324.

This addresses the NAT host 200 where, on the basis of the current mapping, the destination specification 271 in the header of the data packet (IP header) 261 is exchanged for the actual IP address of the computer 220, that is to say the pre-NAT address 145.30.62.1:48324 for the IP address 141.23.209.105:1245. The data packet 261 can thus be mapped by the NAT host 200 to the computer 220 and sent to the latter.

In particular the H.323 or SIP protocol is used in the protocol data for the Voice-over-IP connection establishment. As a consequence, the communication between one or more internal computers (multipoint connection) and one or more external computers on the basis of speech, audio, video and/or useful data is also always ensured by the arrangement for carrying out the method according to the invention.

It should be noted at this point that all the above-described elements are claimed as essential to the invention both individually for themselves and in every combination, in particular the details illustrated in the drawings. Variations of these are known to persons skilled in the art.

The invention claimed is:

1. A method for the packet-oriented transmission of data between an internal network and a public data network, said transmission of data including a Network Address Translation (NAT) processing and further including protocol data arranged to resolve inconsistencies therein, said method comprising:

sending a request of an internal multimedia computer to an NAT address server for the provision of a pre-NAT address for an IP address of the internal computer;

allocating a pre-NAT address to the IP address of the internal computer by the NAT address server;

sending a current allocation data set between the pre-NAT address and the IP address of the internal computer from the NAT address server to an NAT host;

sending the pre-NAT address of the internal computer from the NAT address server to the internal computer;

introducing in a data packet protocol data arranged to contain the pre-NAT address;

sending the data packet with protocol data arranged to contain the pre-NAT address from the internal computer to the NAT host;

exchanging an origin specification in the header of the data packet, the specification containing the IP address of the internal computer, for said pre-NAT address contained in the protocol data; and forwarding the data packet by the NAT host to an externally addressed computer, wherein both the header of the data packet and the protocol data of the data packet each contains said pre-NAT address.

2. The method as claimed in claim 1, further comprising:

receiving a data packet with the pre-NAT address from the externally addressed computer by the NAT host;

exchanging a destination specification in the header of the data packet (IP header), which specification contains the pre-NAT address, for the allocated IP address of the internal computer by the NAT host, using the current allocation data set;

forwarding the data packet by the NAT host to the internally addressed computer.

3. The method as claimed in claim 1, further comprising:

requesting the current allocation data set from the NAT address server by the NAT host.

\* \* \* \* \*